(12) United States Patent
Ezov et al.

(10) Patent No.: US 12,141,706 B2
(45) Date of Patent: Nov. 12, 2024

(54) DATA GENERALIZATION FOR PREDICTIVE MODELS

(71) Applicant: International Business Machines Corporation, Armonk, NY (US)

(72) Inventors: Gilad Ezov, Nesher (IL); Ariel Farkash, Shimshit (IL); Abigail Goldsteen, Haifa (IL); Ron Shmelkin, Haifa (IL); Micha Gideon Moffie, Zichron Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1294 days.

(21) Appl. No.: 16/532,500

(22) Filed: Aug. 6, 2019

(65) Prior Publication Data

US 2021/0042629 A1    Feb. 11, 2021

(51) Int. Cl.
    *G06N 5/02*    (2023.01)
    *G06N 20/00*    (2019.01)
(52) U.S. Cl.
    CPC ............. *G06N 5/02* (2013.01); *G06N 20/00* (2019.01)
(58) Field of Classification Search
    CPC .................................. G06N 5/02; G06N 20/00
    See application file for complete search history.

(56) References Cited

U.S. PATENT DOCUMENTS 7,318,051 B2    1/2008    Weston
8,250,013 B2    8/2012    Fung et al.
(Continued)

FOREIGN PATENT DOCUMENTS

CN    105740388 A    7/2016
CN    106339714 A    1/2017
(Continued)

OTHER PUBLICATIONS

Fong, Simon, Yain-Whar Si, and Robert P. Biuk-Aghai. "Applying a hybrid model of neural network and decision tree classifier for predicting university admission." 2009 7th international conference on information, communications and signal processing (ICICS). IEEE, 2009. (Year: 2009).*

(Continued)

*Primary Examiner* — Kevin W Figueroa
(74) *Attorney, Agent, or Firm* — Steven M. Bouknight (57) ABSTRACT

A method, apparatus and a product for data generalization for predictive models. The method comprising: obtaining a training dataset that comprises a plurality of training instances and predicted labels thereof, wherein each training instance is a valuation of a set of features, wherein the set of features comprises a feature having a domain, wherein the predicted label of each training instance is a label predicted thereto by a predictive model; training an auxiliary model using the training dataset; based on the auxiliary model, determining an alternative set of features that is a generalization of the set of features, wherein the alternative set of features comprises a generalized feature having a generalized domain, wherein each value in the generalized domain corresponds to one or more values in the domain; obtaining a generalized instance having a valuation of the alternative set of features; and determining a label for the generalized instance.

20 Claims, 4 Drawing Sheets

(56) References Cited

U.S. PATENT DOCUMENTS

| | | | |
|---|---|---|---|
| 8,966,649 | B2 | 2/2015 | Stack |
| 9,390,382 | B2 | 7/2016 | Singer |
| 10,043,035 | B2 | 8/2018 | LaFever et al. |
| 10,311,361 | B1 | 6/2019 | Durham et al. |
| 2013/0204834 | A1* | 8/2013 | Forsee, II ............ H04M 3/493 706/52 |
| 2015/0262077 | A1 | 9/2015 | White et al. |
| 2016/0292455 | A1 | 10/2016 | Jebara et al. |
| 2017/0060734 | A1 | 3/2017 | Raz |
| 2018/0300576 | A1 | 10/2018 | Dalyac et al. |
| 2020/0250580 | A1 | 8/2020 | Harman |

FOREIGN PATENT DOCUMENTS

| | | |
|---|---|---|
| CN | 108604902 A | 9/2018 |
| CN | 107085585 B | 6/2023 |
| WO | WO2017222902 A1 | 12/2017 |
| WO | 2019053450 | 3/2019 |

OTHER PUBLICATIONS

Song, Fagen, et al. "A new method of privacy protection: random k-anonymous." IEEE Access 7 (2019): 75434-75445. (Year: 2019).*

Abadi et al., "Deep Learning with Differential Privacy", Proceedings of the 23rd ACM Conference on Computer and Communications Security (CCS 2016), Oct. 25, 2016, pp. 308-318, (arXiv: 1607.00133v2).

Barni et al., "A privacy-preserving protocol for neural-network-based computation", In Proceedings of the 8th Workshop on Multimedia and Security (MM&Sec '06), Sep. 26-27, 2016, ACM, pp. 146-151.

Chabanne et al., "Privacy-Preserving Classification on Deep Neural Network", Published in IACR Cryptology ePrint, 2017, Computer Science, 18 pages.

Ghinita et al., "Fast Data Anonymization with Low Information Loss", VLDB '07, Sep. 23-28, 2007, pp. 758-769.

Hajian et al., "Generalization-based privacy preservation and discrimination prevention in data publishing and mining", Data Mining and Knowledge Discovery Article, Published: Jan. 25, 2014, vol. 28, pp. 1158-1188.

LeFevre et al., "Mondrian Multidimensional K-Anonymity", Proceedings of the 22nd International Conference on Data Engineering (ICDE'06), Downloaded on Mar. 12, 2024, IEEE, 11 pages.

Leray et al., "Feature Selection with Neural Networks", HAL Open Science, Research Report, (1998), 31 pages.

Malle et al., "The Right to Be Forgotten: Towards Machine Learning on Perturbed Knowledge Bases", Conference Paper, Aug. 2016, CD-ARES 2016, (LNCS, vol. 9817), pp. 251-266.

Vecoven, "Master thesis: Feature selection with deep neural networks" (2017), University of Liege, Faculty of Applied Sciences, 77 pages.

Zhang et al., "Privacy-preserving Machine Learning through Data Obfuscation", arXiv: 1807.01860v2, Jul. 13, 2018, 12 pages.

Zhu et al., "2P-DNN : Privacy-Preserving Deep Neural Networks Based on Homomorphic Cryptosystem", Cryptography and Security, Machine Learning, arXiv:1807.08459, Jul. 23, 2018, 12 pages.

Mccallum, Andrew, et al., "Efficient Clustering of High-Dimensional Data Sets with Application to Reference Matching", KDD 2000, Boston, Ma,© ACM 2000, pp. 169-178.

Rokach, Lior, et al., Data Mining and Knowledge Discovery Handbook, Chapter 15: Clustering Methods, © Springer 2005, pp. 321-352.

* cited by examiner

DATA GENERALIZATION FOR PREDICTIVE MODELS

TECHNICAL FIELD

The present disclosure relates to generalizing data in general, and to generalizing data for a predictive model, in particular.

BACKGROUND

Data minimization may refer to the practice of limiting the collection of personal information to that which is directly relevant and necessary to accomplish a specified purpose. As companies and organizations began to understand the power of data, and as data becomes more ubiquitous and easier to collect, analysts are faced with an overwhelming amount of data. For a time, the impulse was to save all of it—indefinitely. With the fast adoption of smartphones, Internet of Things (IoT) devices, or the like, organizations are faced with more and more ways to collect more and more kinds of data, including and especially private, personally identifiable data. Instead saving everything, data managers are now embracing a data minimization policy, keeping only what's relevant and necessary.

BRIEF SUMMARY

One exemplary embodiment of the disclosed subject matter is a method comprising: obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features; training an auxiliary model, wherein the auxiliary model is trained using the training dataset; based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature; obtaining a generalized instance having a valuation of the alternative set of features; and determining a label for the generalized instance.

Another exemplary embodiment of the disclosed subject matter is a computerized apparatus having a processor and coupled memory, the processor being adapted to perform the steps of: obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features; training an auxiliary model, wherein the auxiliary model is trained using the training dataset; based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature; obtaining a generalized instance having a valuation of the alternative set of features; and determining a label for the generalized instance.

Yet another exemplary embodiment of the disclosed subject matter is a computer program product comprising a non-transitory computer readable storage medium retaining program instructions, which program instructions when read by a processor, cause the processor to perform a method comprising: obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features; training an auxiliary model, wherein the auxiliary model is trained using the training dataset; based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature; obtaining a generalized instance having a valuation of the alternative set of features; and determining a label for the generalized instance.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to minimize the data that is collected. In some exemplary embodiments, an entity collecting data may be subject to General Data Protection Regulation (GDPR) regulations. As such, the entity may be required to limit data collection to data that is necessary in relation to the purpose for which the data may be processed. Additionally, or alternatively, GDPR and similar regulations may require that private data that is collected be stored and protected in certain ways. Hence, reduction of the amount of data that is stored may reduce the liabilities of the entity.

Another technical problem dealt with by the disclosed subject matter is to minimize the data that is being collected with respect to a predictive model. In some cases, it may be desired to minimize the data, e.g., the number of features that are being collected and their respective granularities, while still being able to utilize the predicative model to provide quality predictions. As an example, the same data records may be utilized by a predictive model that is configured to predict a heart attack and by predictive model that is configured to predict the number of offsprings of a person. Different types of data minimization may be applied for each predictive model, such as different types of feature generalizing. As an example, the first predictive model may have a performance measurement above 90% in case that the age feature is generalized to ranges of 5 years while the second predictive model may have a performance measurement below 80% in case that the age feature is generalize to such range. As another example, one model may be sensitive to the age being above 50 and the precise value thereof, while the other may be indifferent and provide similar predictions for all values above 40.

Yet another technical problem dealt with by the disclosed subject matter is to minimize the data provided to a predictive model without affecting the performance measurement of the predictive model. It may be desired to minimize the data without causing the performance measurement of the predictive model to decrease below a threshold. The threshold may be an absolute threshold such as 90%, 92%, or the like. Additionally or alternatively, the threshold may be a relative threshold, relative to the performance measurement of the predictive model before the data minimization. As an example, it may be desired that the after minimizing the data, the performance measurement may not decrease more than 5%.

Yet another technical problem dealt with by the disclosed subject matter is to obtain data for a predictive model from a user while asking from the user as less data as possible. As an example, the predictive model may be configured to predict a label based on an income of a user. Instead of requesting from the user to provide his precise income, it may be desired to offer a method that allows the user to select a range in which his income is located. In such a case, the user divulges information that is somewhat private (e.g., yearly income of 100,000 $-150,000$) but less revealing than the precise information itself (e.g., yearly income of 112,568$).

Yet another technical problem dealt with by the disclosed subject matter is to obtain data from a user while taking into account her previous answers in order to minimize the number of answers that she may need to answer to. As an example, a predictive model may be configured to predict if a person is entitled to receive a loan based on her age and on her income. In case that the person has an annual income of more than 500 K$ the predictive model predicts that the user may have the loan regardless of the age of the user. Hence, in case that a user answered that her annual income is above 500 K$ it may not be needed to ask her about her age. As another example, in case the income is between 400 K$ and 500 K, the loan will be granted if her age is below 60. While, if the income is between 100 K$ and 200 K$, the loan will be granted if her age is between 20 and 40. Hence, based on the answer to the income question, the relevant range that is of interest may change.

One technical solution is to train an auxiliary model based on a predictive model and determine an alternative set features based on the auxiliary model. In some exemplary embodiments, the alternative set of features may be a generalization of the set of features of the predictive model. Generalizing the set of features may yield data minimization. The predictive model may have a set of features. Additionally or alternatively, the predictive model may be configured to predict a label for a valuation of the set of features, also referred to as an instance. In some exemplary embodiments, an auxiliary model may be trained using a training dataset comprising training instances and predicted labels thereof. The predicted labels may be determined using the predictive model. In such a manner, the auxiliary model may be trained to provide the same prediction as the predictive model, regardless of whether the prediction of the predictive model is actually correct or incorrect.

In some exemplary embodiments, using the auxiliary model, an alternative set of features that is a generalization of the set of features, may be determined. The alternative set of features may comprise a generalized feature that is a generalization of a feature of the set of features. As an example, instead of having a feature representing the precise age being any number between 1-120, the generalized feature may be a selection between a set of ranges, e.g., [1-20], [21-25], [26-50], [51-120], reducing the granularity of the non-generalized feature. In such a case, the domain of the feature comprised 120 separate values, while the domain of the generalized feature only comprises 4 separate values.

In some exemplary embodiments, the alternative set of features may comprise a generalized feature corresponding each feature of the set of features or a portion thereof. In some cases, the generalized feature may correspond to the feature itself, and have a generalized domain that comprises a smaller number of possible values than in the domain of the corresponding feature. In some cases, each value in the generalized domain may correspond one or more values in the non-generalized domain. Additionally or alternatively, the alternative set of features may omit one or more redundant features from the set of features. The redundant features may not necessarily be redundant per se, however, their value may be relatively insignificant and may not be collected while maintaining a relative quality of prediction.

In some exemplary embodiments, a generalized instance may be obtained. The generalized instance may be a valuation to the alternative set of features. In some exemplary embodiments, a label may be determined for the generalized instance. The label may be determined by utilizing the predictive model, by utilizing the auxiliary model, or the like. In some exemplary embodiments, the generalized instance may be used to generate an instance based thereon. In some cases, the instance may be generated using representative values to the features based on the actual values of generalized features. The predictive model or the auxiliary model may be used to predict a label for the generated instance and the predicted label may be used as the label of the generalized instance.

In some exemplary embodiments, dynamic recoding may be utilized. Dynamic recoding of features may yield different recodings of the same feature and its domain, depending on values of other features. In some exemplary embodiments, a value for a first feature may be obtained. The first feature may be a concrete feature appearing in the set of features, or a generalized feature created in accordance with the disclosed subject matter. Based on the auxiliary model and based on the value of the first feature, a second feature appearing in the set of features may be generalized. In some exemplary embodiments, a generalized domain corresponding a domain of the second feature may be determined. Determining the generalized domain may be based on a valuation of the first feature.

In some exemplary embodiments, the process may continue with additional features. After receiving a valuation for another generalized feature, the next feature may be generalized even further, or even omitted, depending on information extracted from the auxiliary model. After receiving the value of the next feature, the feature that follows may be generalized further, and so forth. In some cases, the determination of the generalized domain for a feature may be based on a value of a single previous feature, valuation of several previous features, or the like, in combination with information extracted from the auxiliary model.

In some exemplary embodiments, the generalized instance may be obtained from a user. A user input may be provided to indicate the value for a feature. The user input may be a selection of the value from a set of alternative values. The alternative values may be the set of possible values as defined by the generalization. Referring to the example above, the alternative values may be either one of the four separate values [1-20], [21-25], [26-50], [51-120] defining different age ranges for the user to select between.

In some exemplary embodiments, in order for the predictive model to be used, a valuation for the set of features may be required. However, if a generalized instance is obtained, a valuation of the alternative set of features is available. In some exemplary embodiments, a value of a generalized feature may be mapped to a concrete value in the domain of the non-generalized, concrete feature. For example, if the user selected the range of [21-25], the value 21 may be utilized. In some exemplary embodiments, an instance may be determined based on the generalized instance. The obtained instance may be an approximation of the actual valuations of the user that are sufficient for the purposes of applying the predictive model. For example, the actual age of the user may be 22 and not 21, but for the purpose of the predictive model, such difference is of little significance.

In some exemplary embodiments, generalized instance may be obtained automatically by a computerized device, such as by an application running on the smartphone of the user, a website automatically collecting data about the user, a wearable device worn by the user, an IoT device, or the like. A computerized device collecting data may be subjected to regulation regarding data collection such as GDPR. As an example, a website may offer vacations to users based on personal data such as age, salary, marital status and the number of offspring. The website, the back end that enhanced the website, or the like, may be configured to generalize the age feature as it may be suffice to know if the age of the user is between 20 and 25, 25 and 30, or the like, in order to offer a vacation to the user, without retaining the actual concrete age of the user.

In some exemplary embodiments, a User Interface (UI), such as Graphical User Interface (GUI), Voice User Interface (VUI), or the like, may be utilized to obtain from a user values for the alternative set of features, thereby obtaining the generalized instance. For each alternative feature comprised by the alternative set of features the UI may comprise a UI element corresponding thereto. As an example, a predictive model may be configured to predict a label based on two features: age and salary. The alternative set of features may comprise the same features with different domains for each feature. The concrete age feature may have a domain that is between 0 and 120 and the concrete salary feature may have a domain that is between 0 and 300,000.

The alternative set of features may have a generalized domain for each feature. The domain of the age feature may be divided to sub domains such as {[0-30]; [31-60]; [61-90]; [91-120]}, thereby defining a generalized age feature. The domain of the salary feature may be divided to sub domains such as {[0-50,000]; [50,001-150,000]; [150,001-200,000]; [200,001-250,000]; [250,001-300,000]}, thereby defining a generalized salary feature.

In some exemplary embodiments, the user interface may be a dynamic user interface. The dynamic user interface may be configured to be updated based on input provided thereto. After obtaining a value for an alternative feature the dynamic UI may be configured to modify a potential input value based on the input provided and based on the auxiliary model. Modifying the potential input value may comprise removing potential answers for an alternative feature, unifying generalized domains of an alternative feature, removing all the answers for an alternative feature, or the like. In some exemplary embodiments, the dynamic UI may implement dynamic recoding of the features, generalizing the remaining features further based on the values that were already provided. Referring again to the above example, the user may indicate that her age is in the range of [61-90], as defined by the generalized age feature. The user may do so without divulging her exact age (e.g., 79). In some exemplary embodiments, the dynamic UI may unify the last two domains of the generalized salary feature [200,001-250,000]; [250,001-300,000] into a single value—[200,001-300,000]. The user may then pick the value for the generalized salary feature between the following four options, instead of five options: [0-50,000]; [50,001-150,000]; [150,001-200,000]; [200,001-300,000].

Additionally or alternatively, the UI elements may correspond to a portion of the alternative features, to a subset of the set of alternative features, or the like. Given a data instance, a subset of the features, of the alternative features, or the like, may suffice for predicting a label. Referring again to the above age and salary example, the bank may decide that given a salary below 50,001$, a loan will never be granted, regardless of the age. Hence, if the user inputs her salary matching the lowest range [0-50,000], there may be no need to receive additional information in order to make a prediction of the label. In that case, the predictive model may predict, based on that feature alone, that the loan will be declined. As a result, there is no need to obtain from the user a value for the age feature. In such a case, the user divulges even less private information, without adversely affecting the quality of the prediction.

Additionally or alternatively, it may not be possible to generalize a feature without causing the performance measurement of the predictive model to decrease below a threshold. Hence at least one feature may not be generalized and it may be necessary to obtain from a user a precise answer for that feature. Based on the auxiliary model, such a feature may be identified, and the alternative set of features may comprise that ungeneralizable feature.

In some exemplary embodiments, a user may determine the order of features in which he is providing answers to. As an example, the UI may be a GUI having a plurality of GUI elements, each of which corresponds to a different alternative feature. The user may pick any GUI element, such as by clicking it, and the GUI may be configured to display possible answers to the user, each answer corresponds to a value of the generalized domain of the alternative features. The user may select a desired value from the possible values. Based on the selection of the user, other alternative features may be further generalized. In such a case, the user may define the order of inputting data. In one case she may first input her salary information and then her age, and in another—vice versa.

Additionally, or alternatively, the dynamic GUI may define an order for the user to input values to alternative features. As an example, the GUI may comprise a sequence of screens, and advancing from one screen to the other is contingent on providing a value to the GUI element appearing in the screen. In such a case, the order of inputting data to the alternative set of features is dictated by the GUI and the user cannot diverge from such order.

Figure 1A:
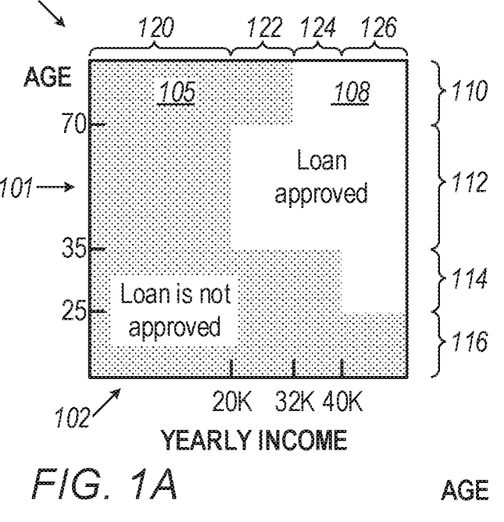
FIGS. 1A-1C show illustrations of 2-dimensional decision maps, in accordance with some exemplary embodiments of the disclosed subject matter.
Figure 1B:
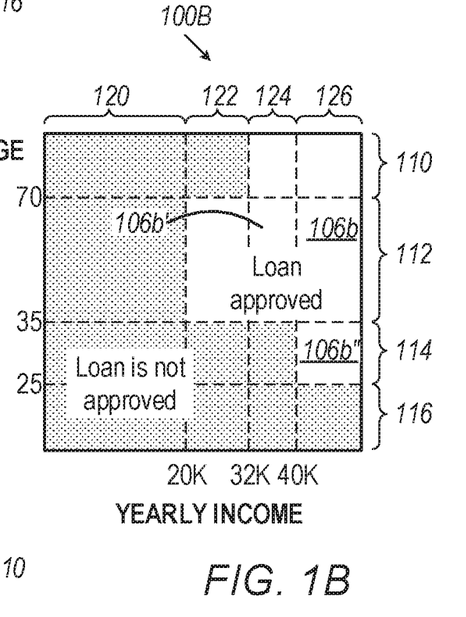
Figure 1C:
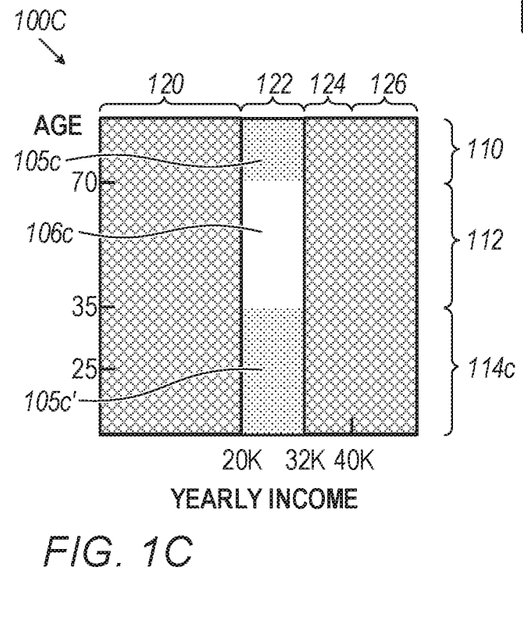
Figure 1D:
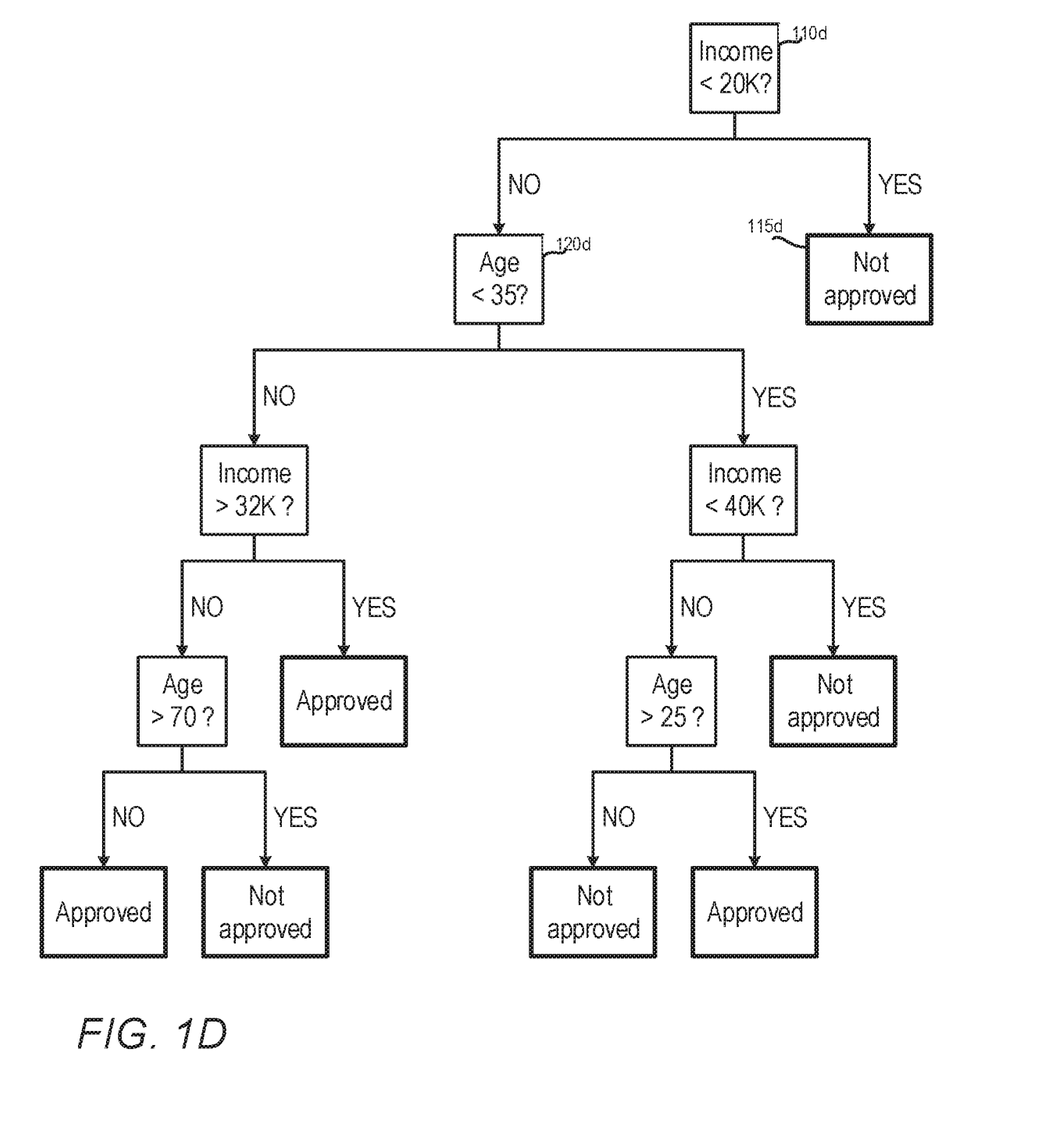
FIG. 1D shows a decision tree in accordance with some exemplary embodiments of the disclosed subject matter.

In some exemplary embodiments, the auxiliary model may be a decision tree, such as the decision tree illustrated in FIG. 1D. The decision tree may comprise a root node (e.g. Root Node 110*d*), internal nodes (e.g. Node 120*d*) and leaf nodes (e.g., Leaf 115*d*). In some exemplary embodiments, an instance may be mapped to a label by traversing the decision tree, starting from the root node. Each internal node may define a branching based on a condition over a value of one feature of instance. Additionally, or alternatively, a branching in the decision tree may be based on a condition on a value of a feature of the set of features. Hence, an instance may correspond a path from the root node to a leaf node. The leaf node may indicate a label to be provided to such instances. In some exemplary embodiments, given an instance that comprises features, a path in the decision tree from the root to a leaf node may corresponds to decisions that the auxiliary model is configured to make in order to predict a label for the instance.

In some exemplary embodiments, a generalized domain of the generalized feature may be determined based on the branchings in the decision tree. Branching in the decision tree may be the basis to determine the generalized features. In some exemplary embodiments, the decision tree that is trained based on the predictions of the predictive model may extract the decision boundaries of the prediction model. In some exemplary embodiments, the leaf nodes of the tree may be used as similar groups of inputs. Generalizations may be created based on the decisions on the tree path leading to that leaf node.

In some exemplary embodiments, the decision tree may create boundaries that are illustrated as straight lines, parallel to the axes. Additionally, or alternatively, the decision tree may create a linear separation of the input domain.

As an example, a decision tree corresponding to a predictive model configured to predict if a person is entitled to a loan based on age and salary may have a branching with a condition determining if the age of the person is below 20 years, between 20 years and 50 years, and above 50 years. Based on such branchings, the age feature may be generalized to a generalized age feature having three possible values {[AGE<20], [20<=AGE<50], [50<=AGE]}.

In some exemplary embodiments, a leaf may be a non-homogenous leaf for which two different instances are associated with different labels. In some exemplary embodiments, the decision tree may be initially generated with homogeneous leaves, i.e., each leaf contains only instances that generate the same classification/decision in the original predictive model. In some exemplary embodiments, a level of generalization may be chosen by iteratively traversing down the decision tree, starting with the root node (which is mapped to all instances) and each time going to one lower level (to a more granular level of generalization) until the desired accuracy is achieved. In such a case, homogenous leaves in the original decision tree may be merged are represented by potentially non-homogenous leaves. Additionally or alternatively, the decision tree may be traversed in the opposite direction, starting at the leaves and going up if the accuracy threshold allows it. Additionally or alternatively, any method of choosing internal nodes or leaves to use as the level of generalization may be utilized. The label of the non-homogenous leaves may be determined based on the predictions of the instances comprised thereby. In some cases, the ratio of successful prediction for an instance in the non-homogenous leaf may be constrained by a predefined parameter indicating quality of prediction of the auxiliary model. If the ratio does not meet the required criteria, the non-homogenous leaf may be split by traversing one more level down in decision tree.

In some exemplary embodiments, determining the label for the generalized instance may comprise determining a concrete instance based on the generalized instance and utilizing a model to predict the label for the concrete instance. The concrete instance may be provided to the predictive model in order to determine a label for the generalized instance. Additionally, or alternatively, the concrete instance may be provided to the auxiliary model instead of using the predictive model itself. In some cases, such as when the predictive model is computationally intensive, as may be the case with Artificial Neural Networks (ANNs), using the auxiliary model (e.g., decision tree), may require less computational resources.

In some exemplary embodiments, the concrete instance may be determined by determining a representative value for the feature based on the value of the generalized feature in the generalized instance. In some exemplary embodiments, the values of the generalized feature may correspond to sub-domains in the domain of the non-generalized, concrete, feature. The representative value may be selected from the sub-domain that corresponds the value of the generalized feature. In some exemplary embodiments, the representative value may be the value at the middle of a range of the relevant sub-domain. In some cases, it may be desired to select a random value from the relevant sub-domain. In some exemplary embodiments, a reference value may be computed and the representative value may be selected based on the reference value. Additionally, or alternatively, the representative value may be selected from a set of observed values. The observed values may be values comprised by training data instances, production data instances, or the like. Additionally, or alternatively, the observed values may be values that were observed a sufficient amount of times, e.g., at least once, at least 100 times, at least in 1% of the instances, or the like. In some exemplary embodiments, the representative value may be an observed value having the smallest distance from the middle of the domain. Additionally or alternatively, the representative value may be the average of observed instances, the mode of observed instances, or the like.

As an example, referring again to the above age and salary example, a user may have selected the value for the generalized salary feature of [50,001-150,000]. The reference value may be the middle of the range, 100,000.5. However, the closest observed value may be 95,654. As a result, the representative value may be the above-mentioned observed value instead of the reference value itself.

In some exemplary embodiments, a name of a value of a generalized feature may be determined automatically. In some exemplary embodiments, the name may be a unification of the concrete values it gathers. For example, for the sub-domain of [20-24], the name may be "20, 21, 22, 23, 24". Additionally, or alternatively, the name may indicate a range, where applicable. In the above example, the value may be "20-24". Additionally, or alternatively, summarization may be used to generalize sets of values. For example, the ages of "0-18" may be referred to as "minors". In some cases, both a summarization and an explicit indication (either by enumeration or by indicating a range) may be utilized. For example: "minor (0-18)". In some exemplary embodiments, the title of a sub-domain may be relative. Consider the salary sub-domain of [100,000-200,000], such salary may be considered high salary, if the other options are [0-10,000], [10,001-[99,999], and it may be considered an average salary if the other options also include [200,001-1, 000,000].

One technical effect of utilizing the disclosed subject matter is a minimization of the data that may be required for the predictive model in order to predict a label. Generalized features may yield data minimization as users may be requested to provide values in reduced granularity instead of providing an accurate value. As an example, a predictive model may be applied on data records in order to predict whether a person might have a heart attack. The data records may comprise features such as age, weight, height, annual salary, or the like. Instead of obtaining from a user her age, weight, height and annual salary, ranges for each feature may be obtained and a label may be predicted based thereon Minimizing the data records may be performed by obtaining a range for each feature. As an example, instead of collecting the age of a person, a range of ages may be collected (e.g. 30-35 instead of 32). As another example, a general category may be chosen instead of a detailed category. A person may be a nurse, a doctor, or the like. Instead of recording her profession, a category such as "health professional" may be recorded.

Another technical effect of utilizing the disclosed subject matter is a reduction in computational resources needed for predicting a label for an instance. In some exemplary embodiments, the auxiliary model may be utilized in order to predict a label for a data instance. The auxiliary model may require less computational resources in order to predict the label in comparison to the predictive model. In some cases, the predictive model may be a more complicated model, of a different type, such as, for example, a deep neural network, in comparison to a relatively simple auxiliary model, such as, for example, a decision tree. In some exemplary embodiments, by utilizing the auxiliary model to provide a prediction, the disclosed subject matter may provide a prediction using a reduced amount of computational resources compared to the resources required to apply the predictive model itself.

Yet another technical effect of utilizing the disclosed subject matter is a reduction in storage space required for storing the data, bandwidth required for transmitting the data and power that is required for transmitting the data. In some exemplary embodiments, data instances may be retained for quality assurance, for training other models, for retraining the predictive model, or the like. Additionally or alternatively, it may be desired to transmit data instances to a remote server. As an example, a data instance may be obtained from an IoT device. The IoT device may measure temperature, humidity, light, or the like every second. Instead of retaining exact values, recoding may be applied to utilize a reduced amount of bits to represents the more generalized data. In some cases, the generalization may be considered as a form of lossy compression that loses insignificant information with respect to the predictive model.

Referring now to FIG. 1A-1C, showing illustrations of 2-dimensional decision maps, in accordance with some exemplary embodiments of the disclosed subject matter.

In some exemplary embodiments, a predictive model may be configured to predict if a loan is approved based on two features: age and yearly income. A Decision Map 100a may illustrate the decisions of the predictive model, as may be determined using an auxiliary model. Vertical Axis 101 represents the age feature and Horizontal Axis 102 represents the yearly income feature. Area 105 corresponds to a prediction that the loan is not approved, while Area 106 corresponds to a prediction that the loan is approved. As can be appreciated from Decision Map 100a, the age feature may be divided into four sub domains: 110, 112, 114, 116. Sub-Domain 110 may comprise ages above 70, Sub-Domain 112 may comprise ages between 35 and 75, Sub-Domain 114 may comprise ages between 25 and 35, and Sub-Domain 116 may comprise ages below 25. Horizontal Axis 102 is similarly divided into four sub domains: Sub-Domains 120, 122, 124, 126, representing income of below 20 K, between 20 K and 32 K, between 32 K and 40 K and above 40 K, respectively. The sub-domains may be determined based on the auxiliary model, and while taking in consideration the different labels that the model is expected to provide. As can be appreciated, Decision Map 100a may be the outcome of an analysis of a decision tree, which enforces a linear separation of the input domain, being represented by straight, boundaries that are parallel to the axes.

Decision Map 100b exemplifies a static recoding of the features. Each feature may be generalized based on the corresponding sub-domains thereof. As a result, instead of requesting that the user input her precise age and income, it is sufficient that the user indicates in which sub-domains she is located. In each and every case, there are four options for the generalized age feature (corresponding Sub-Domains 110, 112, 114, 116) and four options for the generalized income feature (corresponding Sub-Domains 120, 122, 124, 126). Based on the selection of the sub-domains (e.g., the values of the generalized features), the location of the user in Decision Map 100b may be determined, and a label may be predicted. For example, if the user selects Sub-Domain 112 and Sub-Domain 126, the user is mapped to Area 106b. If instead the user selects a different sub-domain for the income, such as Sub-Domain 124, the user is mapped to Area 106b'. As another example, if the user selects a different sub-domain for the age, such as Sub-Domain 114, the user may be mapped to Area 106b". As can be appreciated, the dashed vertical and horizontal dashed lines indicate the boundaries that affect the decision, in accordance with the specific predictive model of interest.

Decision Map 100c exemplifies dynamic recoding of the features. Decision Map 100c illustrates, that upon determining a value or a sub-domain for a first feature, the decision boundaries for another feature may change. In the illustration, Sub-Domain 122 may be selected for the income feature. As a result, there may be three potential areas of interest, Area 105c, Area 105c' and Area 106c. As can be appreciated, the age feature may be divided into three sub-domains instead of four sub-domains, while unifying Sub-Domains 114 and 116 to a single sub-domain—Sub-Domain 114c. Additionally or alternatively, Sub-Domains 110 and 114c may also be unified, if non-continuous sub-domains are utilized.

It is further noted, that if a different sub-domain for the income feature would have been chosen, a different generalization of the age feature may be determined. For example, in case of Sub-Domain 126, there may be two sub-domains: one unifying Sub-Domains 110, 112, 114 and the other being Sub-Domain 116. As yet another example, if Sub-Domain 120 is selected, the age feature may be omitted altogether, as the prediction is indifferent of the value of the age feature.

Referring now to FIG. 1D showing an exemplary decision tree, in accordance with some exemplary embodiments of the disclosed subject matter.

Root Node 110*d* may hold a condition whether the income of a user is below 20 K. Root Node 110*d* may define a branching in the tree based on the condition. In case that the income of the user is below 20 K, a path to Leaf 115*d* may be yielded, indicating that the loan is not approved. Otherwise, the path continues to Node 120*d*.

In some exemplary embodiments, the branchings of the decision tree may be utilized to define the sub-domains. For example, based on Node 110*d*, it may be determined that the age feature may be divided, at least, to two sub-domains: below 20 and above 20.

In some exemplary embodiments, Node 120*d* may hold a condition whether the age of the user is below 35. As can be seen, Node 120*d* defines a branching in the decision tree based on the value of the age. Hence, the values of age may also be divided based on whether the age is below or above 35.

As can be appreciated, the different branchings in the decision tree define the boundaries in Decision Map 100*a*. Each value that is used to divided sub-domains in Decision Map 100*a* results from a branching in the decision tree. For example, there are decisions that are based on whether the age is below 25, below 35, above 70, and accordingly, there are four sub-domains, Sub-Domains 110, 112, 114, 116. Due to such division, the branching imply a vertical or horizontal boundary in Decision Map 100*a*.

Figure 2:
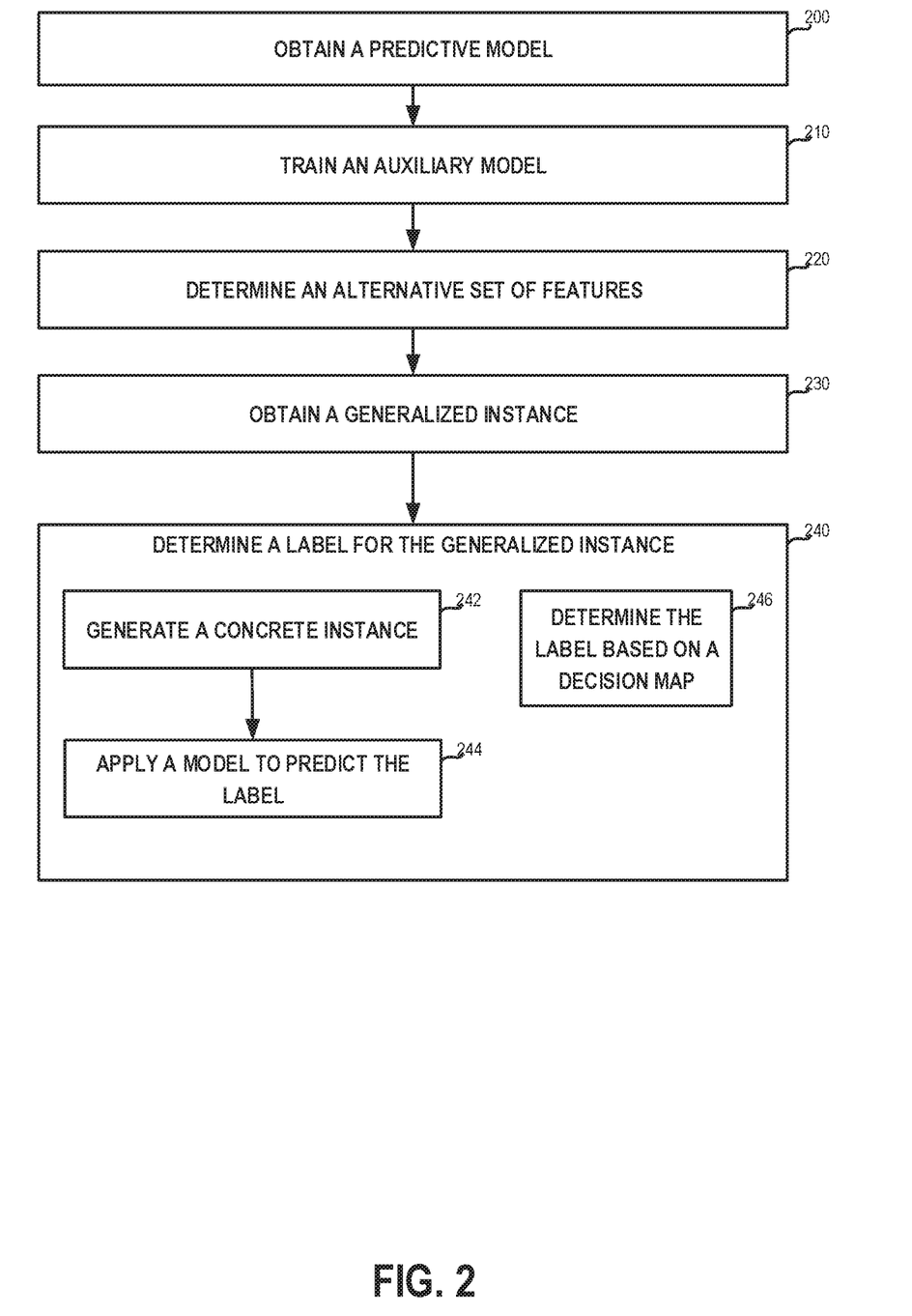
FIG. 2 shows a flowchart diagram of a method, in accordance with some exemplary embodiments of the disclosed subject matter.

Referring now to FIG. 2, showing a flowchart diagram of a method, in accordance with some exemplary embodiments of the disclosed subject matter.

On Step 200, a predictive model may be obtained. The predictive model may be configured to predict a label for a data instance. In some exemplary embodiments, the data instance may comprise a valuation for each feature in a set of features. Each feature of the set of features may have a corresponding domain of potential values. In some exemplary embodiments, the set of features may be considered as a set of concrete features, which may be generalized to a set of generalized features, in accordance with the disclosed subject matter.

On Step 210, an auxiliary model may be trained. The auxiliary model may be trained based on the predictive model. In some exemplary embodiments, the auxiliary model may be trained with labels as predicted by the predictive model. The auxiliary model may be configured to predict a label for a data instance comprising the features. In some exemplary embodiments, a set of data instances may be obtained. The predictive model may be applied thereon to determine a predicted label thereof. The data instances and the predicted labels thereof may be utilized as a training dataset in training the auxiliary model.

In some exemplary embodiments, the auxiliary model may be trained without having access to the predictive model itself. A training dataset may be obtained, such as from a third party having access to the predictive model. The training dataset may comprise instances and the label predicted thereto by the predictive model. The third party may compile the training dataset and provide it to an entity performing the method of FIG. 2.

It is noted that the predictive model and the auxiliary model may be of any type such as ANN model, a random forest classifier, Support Machine Vector (SMV), or the like. The predictive model and the auxiliary model may be of different types. Additionally or alternatively, the predictive model and the auxiliary model may be of the same type. In some exemplary embodiments, the predictive model and the auxiliary model may be of the same type, while the auxiliary model may be relatively simple. As an example, both the predictive model and the auxiliary model may be an ANN. However, the architecture of the predictive model may be more complex, such as comprise more nodes, comprise more layers, or the like, in comparison to the architecture of the auxiliary model. Additionally or alternatively, both models may be decision trees, however the number of nodes in the trees may be different and the size of the decision tree of the auxiliary model may be smaller than that of the predictive model.

On Step 220, an alternative set of features may be determined. The alternative set of features may be determined based on the auxiliary model. The alternative set of features may be a generalization of the set of concrete features. For example, each feature in the alternative set of features may be a generalized feature that corresponds to a concrete feature used by the predictive model. The generalized feature may correspond to a generalized domain of potential values thereof. Each value in the generalized domain may correspond to one or more values in the domain. For example, a single value in the generalized domain may correspond a set of values in the domain of the corresponding concrete feature. The set of values may be referred to as a sub-domain. Additionally, or alternatively, in some cases, a single value in the generalized domain may still be mapped to a single value in the domain of the concrete feature. In some exemplary embodiments, the number of values in the domain of the concrete feature is greater than the number of values in the generalized domain of the corresponding generalized feature.

In some exemplary embodiments, a generalization of the set of features may provide an alternative set of features in which there is at least one generalized feature. The generalized feature may be a generalization of a concrete feature that is comprised by the set of features. In some exemplary embodiments, the alternative set of features may comprise non-generalized, concrete features, in addition to the generalized feature. For example, the set of features may comprise four concrete features $(f_1, f_2, f_3, f_4)$. One possible generalization of the set of feature may be a set of one generalized feature and three concrete features, such as $(f_1', f_2, f_3, f_4)$, where is a generalization of $f_1$. Another generalization of the set of features may be a set of four generalized features, such as $(f_1', f_2', f_3', f_4')$, where $f_i'$ is a generalization of $f_i$. Another example of a generalization of the set of features may be a set comprising less than four features, such as a set comprising a generalized feature and two concrete features, e.g., $(f_1', f_2, f_4)$, where the information encoded in feature $f_3$ may be omitted without adversely affecting the accuracy of the predictive model beyond an acceptable threshold.

It is noted that although the concrete domain and generalized domain may be a range having theoretically infinite number of possible values, the number of possible values in the domain in accordance with the disclosed subject matter may be finite as it may be implemented by a computerized device.

In some exemplary embodiments, a desired accuracy for the auxiliary model may be determined. Additionally or alternatively, the auxiliary model may be determined based on a decision tree with homogeneous leaves. In some exemplary embodiments, a homogeneous leaf in a decision tree may be a leaf that is characterized by having all instances that are mapped thereto, being associated with the same prediction. For example, each instance that is mapped to Leaf Node 115d may be predicted as "not approved". In some exemplary embodiments, branchings in the decision tree may be used to generalize concrete features. Additionally or alternatively, instances that are mapped to the same leaf may be considered as an equivalence group and be generalized based on their similarity. Additionally or alternatively, different levels of generalization may be implemented. The homogenous decision tree may be traversed iteratively, starting from the root node. In each level, the performance measurement of the sub-tree ending at the iterated level may be measured. In case that the performance measurement is below the desired performance measurement, the iteration may stop and the sub-tree that was determined in the previous iteration may be utilized as the auxiliary model. Branchings of the sub-tree may be utilized to generalize the concrete features.

On Step 230, a generalized instance may be obtained. The generalized instance may comprise a valuation of the alternative set of features. The generalized instance may be a generalization of a concrete instance.

In some exemplary embodiments, obtaining a generalized instance may comprise obtaining a user input of the value for a generalized feature comprised by the alternative set of features. The user input may be selection of a value from the corresponding generalized domain of the generalized feature. As can be appreciated, instead of providing the concrete, potentially highly-private information (e.g., precise yearly income), the user may provide a more general information that is less revealing (e.g., a range matching her yearly income).

In some exemplary embodiments, the user input may be obtained using a UI having an input element. The UI element may correspond to a generalized feature. Using the UI element, the user may provide a valuation to the generalized feature. For example, the UI element may be a scroll down element, and the user may select the salary range that matches hers. Additionally, or alternatively, the UI element may be a radio button providing a plurality of alternative ranges from which the user selects. Additionally, or alternatively, the UI element may be an input field and the user may provide the concrete value, which may be generalized automatically into the corresponding value in the generalized domain. For example, the user may provide her actual age. However, the disclosed subject matter, be it in the UI or in a backend, may determine which sub-domain comprises the age, and a value that is mapped to the sub-domain may be selected for the generalized feature. Additionally or alternatively, a mapping function from the concrete value to the generalized value may be utilized. In some exemplary embodiments, generalizing the information provided by the user may allow reduction in storage space, computational resources, bandwidth, or the like, without substantially adversely affecting the ability to provide an accurate prediction thereto. Additionally or alternatively, the generalization of the concrete value may also be useful so as to ensure the generalized instance is not subject to a requirement of a privacy regulation, such as requirements of the GDPR.

In some exemplary embodiments, the UI may be a dynamic UI. The dynamic UI may be configured to be updated based on a previous input. As an example, referring again to FIG. 1C. An input may be obtained from a user indicating that her income matches sub-domain 122 (between 20 K and 32 K). Based on such selection, the potential values for the input element corresponding the age feature may be updated to reflect a selection between three sub-domains (110, 112, and 114c), as opposed to the original selection which may have been between four sub-domains (110, 112, 114, 116, as is illustrated in FIG. 1A).

In some exemplary embodiments, the dynamic UI may be a UI dictating an order between the features (e.g., consecutive screens; disabled elements that are enabled in a predetermined order, or the like). Additionally or alternatively, the dynamic UI may allow the user to provide her input at an order of her choosing. For example, the dynamic UI may be a single form comprising enabled UI elements corresponding each feature. The user may first input her yearly income (e.g., Sub-Domain 122) and then input her age (e.g., between Sub-Domains 110, 112, 114c). Additionally or alternatively, the user may first input her age (e.g., Sub-Domain 114) and then input her yearly income (e.g., a selection between two options: a sub-domain that comprises 120, 122 and 124, and Sub-Domain 126). As yet another example, based on a first provided input, the second feature may not be required. For example, if the user input her age as below the age of 25 (e.g., Sub-Domain 116), the yearly income may not affect the outcome and the loan may be predicted as not approved regardless of her income. As a result, the dynamic UI may disable or hide the element corresponding the yearly income feature.

On Step 240, a label for the generalized instance may be determined. In some exemplary embodiments, the label may be determined using a decision map, such as Decision Map 100b of FIG. 1B.

On Step 246, Using the generalized values (e.g., sub-domains) a grouping in the decision map may be identified and a label may be determined based thereof. For example, if Area 106b is identified, the label may be "loan approved".

Additionally or alternatively, on Step 242, a concrete instance may be generated based on the generalized instance. The generated concrete instance may be different than a concrete instance that accurately depicts the user. However, the differences between the generated concrete instance and the accurate concrete instance may substantially insignificant from the point of view of the predictive model.

In some exemplary embodiments, a representative value may be determined for a value of a generalized feature. For example, the value of the generalized feature may be age between 25 and 35 (Sub-Domain 114), the representative value may be any value in the relevant sub-domain, such as 25, 26, 30, or the like. In some exemplary embodiments, the representative value may be a random value within the sub-domain. Additionally, or alternatively, the representative value may be determined based on a computation, such as a mean, a mode, an average, a middle, or the like of the sub-domain. In some cases, it may be desired to only utilize observed values, and the representative value may be selected from the set of observed values in the sub-domain. Additionally, or alternatively, the representative value may be selected from the set of observed values based on a computed reference value, such as the middle of the sub-domain, a mode of the observed values, or the like. For example, the observed value may be the value that is characterized by having the smallest distance from the computed average of the sub-domain.

determining the label for the generalized instance may comprise determining a concrete instance based on the generalized instance. The concrete instance may comprise a valuation of the set of features, each of which may correspond to the valuation of the alternative set of features. In some exemplary embodiments, the predictive model, the auxiliary model, or the like may be utilized to predict a label for the concrete instance. The label may be the label for the generalized instance.

On Step 244, a label may be predicted for the generated concrete instance. In some exemplary embodiments, the auxiliary model may be applied to predict a label for the generated concrete instance. Additionally or alternatively, the predictive model itself may be applied to predict a label for the generated concrete instance. It may be noted that the auxiliary model and the predictive model may require a valuation of the set of features in order to provide a prediction. In view of such requirement, Step 242 may be performed to generate a concrete instance that represents a potential instance that would match the generalized instance. The generated concrete instance may be an inaccurate representation of the actual instance that was generalized. Referring again to the example of the age/income, while the actual user may be of the age of 22 and an income of 25 K, the generated concrete instance may be of age 21 and income 20 K. As another alternative, the generated concrete instance may be of age 32 and income 31 K. Although the generated concrete instance may be inaccurate, the fact that the generalization is performed with respect to the predictive model itself, the accuracy of the prediction may be within a desired accuracy threshold.

Figure 3:
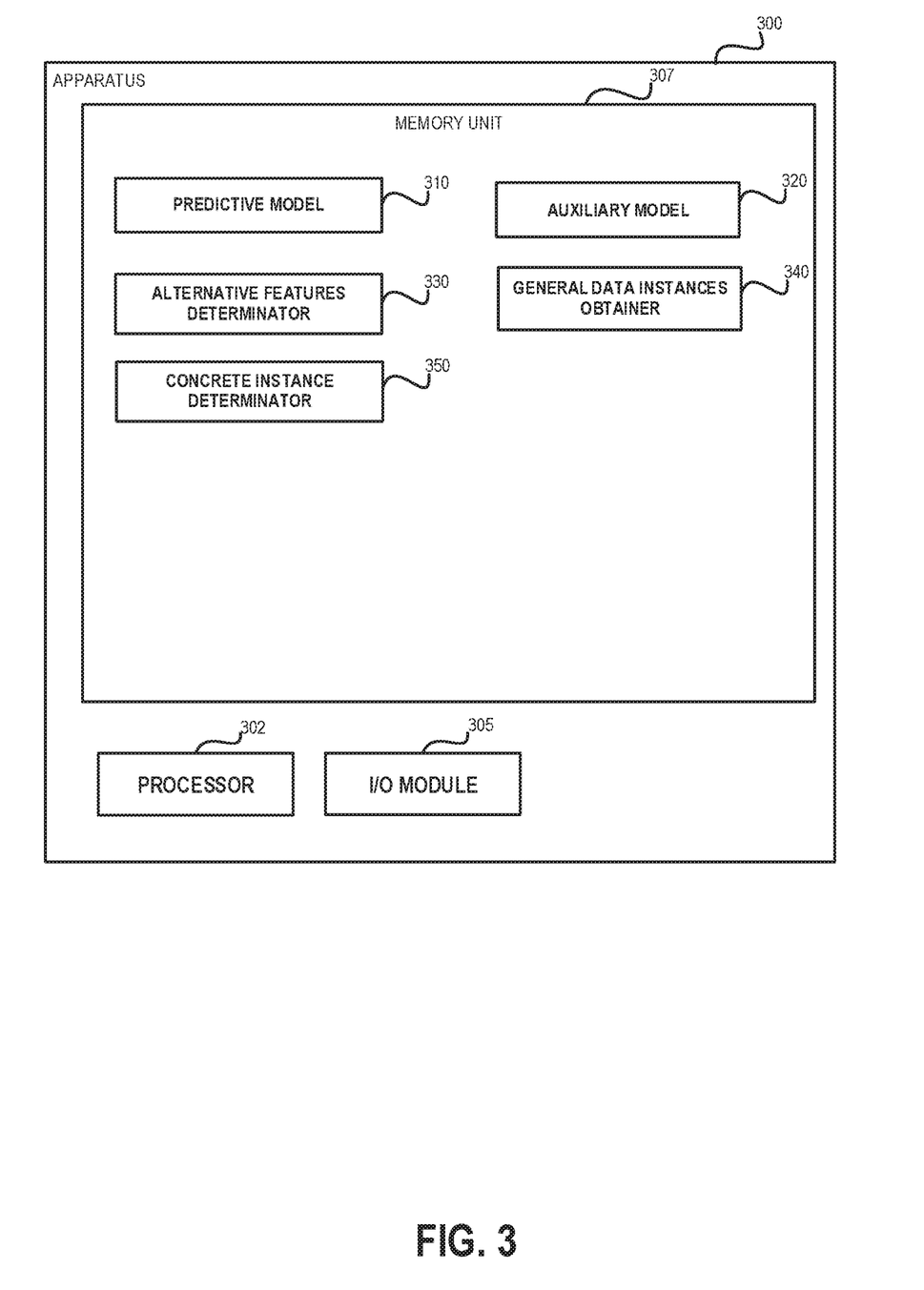
FIG. 3 shows a flowchart diagram of a method, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents.

In some exemplary embodiments of the disclosed subject matter, Apparatus 300 may comprise an Input/Output (I/O) module 305. I/O Module 305 may be utilized to provide an output to and receive input from a user, such as, for example obtaining a generalized instance, providing a prediction, or the like. Additionally or alternatively, a UI may utilize I/O Module 305 in order to provide a UI to a user, to provide a dynamic UI, or the like. In some exemplary embodiments, I/O Module 305 may be configured to obtain a predictive model, obtain a dataset, or the like.

In some exemplary embodiments, Apparatus 300 may comprise Memory Unit 307. Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may store datasets, measurements performance results, or the like. Additionally or alternatively, Memory Unit 307 may store a predictive model, an auxiliary model, or the like.

Memory 307 may comprise one or more components as detailed below, implemented as executables, libraries, static libraries, functions, or any other executable components.

In some exemplary embodiments, a Predictive Model 310 may be a machine learning model, an ANN model such as Convolutional Neural Network (CNN), Recurrent Neural Network (RNN), a Deep Neural Network, (DNN) model, a SVM, a decision tree, or the like. Additionally or alternatively, Predictive Model 310 may be a classification model such as Structured Data Classification, Naïve Bayes, Stochastic Gradient Descent, or the like. In some exemplary embodiments, Predictive model 310 may be configured to predict a label for an instance based on a set of features thereof. It may be desired to determine an alternative set of features that may be a generalization of the set of features, yielding data minimization that takes into account the information that is important to Predictive Model 310. It is noted that the term "predictive model" should be construed to include models that are used to provide a prediction about an instance, a classification about an instance, or the like. The term should not be construed to solely refer to future predictions.

In some exemplary embodiments, an Auxiliary Model 320 may be a machine learning model, an ANN model such as CNN, RNN, a DNN model, a SVM, a decision tree, Structured Data Classification, Naïve Bayes, Stochastic Gradient Descent, or the like. In some exemplary embodiments, an Auxiliary Model 320 may be trained based on Predictive Model 310. In some exemplary embodiments, a training dataset for Auxiliary Model 320 may be obtained, such as by obtaining instances and determining labels thereof using Predictive Model 310.

In some exemplary embodiments, an Alternative Features Determinator 330 may be configured to determine an alternative set of features. The alternative set of features may be a generalization of the set of features. The alternative set of features may comprise a generalized feature having a generalized domain corresponding to a feature having a domain. The number of values in the domain may be greater than the number of values in the generalized domain. In some exemplary embodiments, the alternative set of features may be determined using Auxiliary Model 320. Additionally or alternatively, a decision map, such as Decision Map 100*a* of FIG. 1A, may be generated based on Auxiliary Model 320.

In some exemplary embodiments, a General Data Instances Obtainer 340 may be configured to obtain a generalized instance. In some exemplary embodiments, General Data Instances Obtainer 340 may obtained the generalized instance from a user, from sensors, from computerized devices, or the like. In some exemplary embodiments, General Data Instances Obtainer 340 may obtain the generalized instance or portion thereof using a UI, a dynamic UI, or the like. General Data Instances Obtainer 340 may be configured to generate a set of answers, which correspond to a generalized domain of a generalized feature. In some exemplary embodiments, General Data Instance Obtainer 340 may be configured to provide the user with a means to select between the different answers, so as to indicate a generalized value. In some exemplary embodiments, General Data Instance Obtainer 340 may configured to generate a plurality of sets, each set corresponding to a different generalized feature.

In some exemplary embodiments, General Data Instance Obtainer 340 may be configured to utilize a dynamic UI. General Data Instance Obtainer 340 may obtain an answer corresponding to one generalized feature. In response to receiving the answer, Alternative Features Determinator 330 may be re-invoked so as to take into account the answer and to re-generate the plurality of the set of answers for the remaining alternative features. In some exemplary embodiments, re-generating a set of answers may be based on a previous answer, a plurality of previous answers, or the like, and may be performed using Auxiliary Model 320.

In some exemplary embodiments, a Concrete Instance Determinator 350 may be configured to determine a concrete instance based on a generalized instance. An answer that was obtained by General Data Instance Obtainer 340 may comprise a general value of a generalized domain corresponding to a sub-domain in a domain of an alternative feature. A representative value for the generalized domain may be determined by determining the middle of the sub-domain, by determining an observed value having the smallest Euclidean distance to the middle of the sub-domain, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features;
   training an auxiliary model, wherein the auxiliary model is trained using the training dataset, wherein said training is based on the predicted labels outputted by the predictive model, whereby the auxiliary model is configured to provide a same prediction as the predictive model;
   based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature;
   obtaining a generalized instance having a valuation of the alternative set of features; and
   determining a label for the generalized instance.

2. The method of claim 1, wherein said determining the alternative set of features comprises:
   obtaining a value for an additional feature, wherein the alternative set of features comprise the additional feature; and
   determining, based on the auxiliary model and based on the value of the additional feature, the generalized domain for the domain, whereby determining the generalized domain for the feature based on a valuation of the additional feature.

3. The method of claim 2, wherein said obtaining comprises obtaining a user input of the value for the additional feature, wherein the user input is a selection of the value from a set of alternative values, wherein the alternative values are a generalization of possible values to a concrete feature corresponding to the additional feature, wherein the generalization is determined using the auxiliary model.

4. The method of claim 1, wherein said obtaining the generalized instance comprises obtaining from a user, using a User Interface (UI), values for the alternative set of features, wherein the values obtained from the user relate to the user, and wherein the user interface comprises an input element corresponding to each of the alternative set of features.

5. The method of claim 4, wherein the user interface is a dynamic user interface that is configured to be updated based on input provided thereto, wherein the dynamic user interface is configured to modify potential input values to the generalized feature based on input provided by the user with respect to other features and based on the auxiliary model.

6. The method of claim 5, wherein an order of providing input to the input elements of the dynamic UI is determined by a user.

7. The method of claim 1, wherein the auxiliary model is a decision tree, wherein the decision tree comprises a root, internal nodes and leaf nodes, wherein a branching in the decision tree is based on a condition on a value of a feature of the set of features, wherein the generalized domain of the generalized feature is determined based on the branchings in the decision tree.

8. The method of claim 7, wherein at least one leaf is a non-homogenous leaf for which two different instances are associated with different labels.

9. The method of claim 1, wherein said determining the label for the generalized instance comprises:
   determining a concrete instance based on the generalized instance, wherein the concrete instance comprises a valuation of the set of features that corresponds to the valuation of the alternative set of features; and
   utilizing a model to predict the label for the concrete instance, wherein the model is one of the predictive model and the auxiliary model.

10. The method of claim 9, wherein said determining the concrete instance comprises: determining a representative value for the feature based on a valuation in the generalized instance of the generalized feature, wherein the representative value is a value of a subset of the domain, wherein the subset of the domain corresponds to the valuation of the generalized feature, whereby determining a concrete value in the domain based on the generalized value in the generalized domain.

11. The method of claim 10, wherein said determining the concrete value comprises calculating a middle value of a range of the generalized domain.

12. The method of claim 10, wherein said determining the concrete value comprises:
   computing a reference value of the generalized domain; and
   selecting the concrete value based on the reference value, wherein said selecting is performed from a set of observed values.

13. The method of claim 1, wherein said obtaining the training dataset comprises obtaining the predictive model and applying the predictive model on the training instances, whereby obtaining a predicted label for each training instance.

14. A computer program product comprising a non-transitory computer readable storage medium retaining program instructions, which program instructions when read by a processor, cause the processor to perform:

obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features;

training an auxiliary model, wherein the auxiliary model is trained using the training dataset, wherein said training is based on the predicted labels outputted by the predictive model, whereby the auxiliary model is configured to provide a same prediction as the predicative model;

based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature;

obtaining a generalized instance having a valuation of the alternative set of features; and     determining a label for the generalized instance.

15. The computer program product of claim 14, wherein said determining the alternative set of features comprises:

obtaining a value for an additional feature, wherein the alternative set of features comprise the additional feature; and     determining, based on the auxiliary model and based on the value of the additional feature, the generalized domain for the domain, whereby determining the generalized domain for the feature based on a valuation of the additional feature.

16. The computer program product of claim 15, wherein said obtaining comprises obtaining a user input of the value for the additional feature, wherein the user input is a selection of the value from a set of alternative values, wherein the alternative values are a generalization of possible values to a concrete feature corresponding to the additional feature, wherein the generalization is determined using the auxiliary model.

17. The computer program product of claim 14, wherein said obtaining the generalized instance comprises obtaining from a user, using a User Interface (UI), values for the alternative set of features, wherein the values obtained from the user relate to the user, and wherein the user interface comprises an input element corresponding to each of the alternative set of features.

18. The computer program product of claim 14, wherein the user interface is a dynamic user interface that is configured to be updated based on input provided thereto, wherein the dynamic user interface is configured to modify potential input values to the generalized feature based on input provided by the user with respect to other features and based on the auxiliary model.

19. The computer program product of claim 14, wherein said determining the label for the generalized instance comprises:

determining a concrete instance based on the generalized instance, wherein the concrete instance comprises a valuation of the set of features that corresponds to the valuation of the alternative set of features; and     utilizing a model to predict the label for the concrete instance, wherein the model is one of the predictive model and the auxiliary model.

20. A computerized apparatus having a processor and coupled memory, the processor being adapted to perform the steps of:

obtaining a training dataset, wherein the training dataset comprises a plurality of training instances and predicted labels thereof, wherein each training instance is a valuation of a set of features, wherein the set of features comprises a feature having a domain, wherein the predicted label of each training instance is a label predicted thereto by a predictive model, wherein the predictive model is configured to predict a label for a valuation of the set of features;

training an auxiliary model, wherein the auxiliary model is trained using the training dataset, wherein said training is based on the predicted labels outputted by the predictive model, whereby the auxiliary model is configured to provide a same prediction as the predictive model;

based on the auxiliary model, determining an alternative set of features, wherein the alternative set of features is a generalization of the set of features, wherein the alternative set of features comprises a generalized feature having a generalized domain, wherein each value in the generalized domain corresponds to one or more values in the domain, wherein a number of values in the domain is greater than a number of values in the generalized domain, whereby the generalized feature is a generalization of the feature;

obtaining a generalized instance having a valuation of the alternative set of features; and     determining a label for the generalized instance.

\* \* \* \* \*